July 29, 1969   C. A. LONG   3,457,961

PRESSURE VESSEL

Filed April 3, 1967

United States Patent Office 3,457,961
Patented July 29, 1969

3,457,961
PRESSURE VESSEL
Charles A. Long, Titusville, Pa., assignor to Struthers Wells Corporation, a corporation of Maryland
Filed Apr. 3, 1967, Ser. No. 627,970
Claims priority, application Great Britain, May 10, 1966, 20,659/66
Int. Cl. F16l 9/14; F17c 1/00
U.S. Cl. 138—143                                        3 Claims

ABSTRACT OF THE DISCLOSURE

A pressure vessel for hydrogen or hydrocarbons having a steel outer shell, an inner liner which resists hydrogen embrittlement and other damaging effects and which may not be easily welded to steel, said outer shell having a girth weld with a smoothed inner surface, an annular bar of the material of the liner which is thinner than the liner and covers the inner surface of said girth weld, and an inner weld joining the liner and extending over the inside of the bar, said inner weld being of the material of the liner and not penetrating or bonding to the outer shell, gas passing through said inner weld flowing laterally between said liner and said shell to radial vent apertures in the shell.

Background of invention

My invention is applicable to any pressure vessel having a steel shell which may be of monoblock or multiple layer construction and adapted to contain hydrogen gas or gases therein under pressure and at low and ambient temperature. It is particularly adapted for use with vessels employed in the processing of hydrocarbon fluids at high temperature or with fluids having hydrogen gas evolved or added during processing. It is similarly adapted for storing hydrogen gas or gases containing hydrogen. Such vessels include gaseous storage vessels and relatively high temperature vessels, such for example as pressure stills, fractionation and petroleum cracking towers and the like.

It has been proposed in the past to provide such vessels with corrosion resisting liners and liners of alloy content to resist the detrimental effects of the vessel contents, and to vent from outside these liners through the vessel heavy wall, thus relieving the hydrogen gas seepage and preventing pressure and damage to the heavy vessel wall. Such construction is known and used in the industry for vessel walls.

Such construction is satisfactory insofar as those portions of liners between the shell course's ends are concerned, but it is unsatisfactory at then ends of the shell courses and particularly unsatisfactory at the joining circumferential girth seams. The present circumferential seam welds the liner girth seam and then is continuously formed outward through the vessel wall. This conventional construction provides a continuous metal path for hydrogen seepage outwardly into and through the girth weld, thus causing hydrogen embrittlement and other damaging effects and cracking of the weld entirely through the girth weld with possible catastrophic failure of the vessel.

Summary of the invention

My invention provides a pressure vessel having a special lining which is applied to the vessel in such a manner as to overcome the difficulties in welding the girth seams herein above referred to. My invention is less expensive than constructing the vessel of resisting and expensive alloy bearing materials and welding girth seams between the courses and their heads with expensive alloy welding materials which resist hydrogen embrittlement. The known venting construction of layer vessels have girth welds permitting gas seepage and the probability of hydrogen embrittlement through their non-ventilated and solid girth welds with solid metal weld material paths from the inside of the vessel through the wall. My invention provides a separation between the solid liner weld holding the pressure of the vessel contents and the heavier outside girth weld of the heavy vessel wall. My invention separates the metal girth weld of the inner liner and the metal girth weld of the heavy vessel wall and imposes a separation of the girth weld metal with a venting space between the inside and outer heavier girth weld allowing gas seepage penetrating the inner resisting alloy and its girth weld without its penetrating through a continuous metal path outwardly through the total girth weld jointure seam. The seepage through the inner alloy layer is vented sideways and longitudinally traveling out to the atmosphere through vent holes provides outwardly through the vessel wall from just outside the vessel liner.

It is known that hydrogen gas may be adsorbed in steel and cause hydrogen embrittlement, other damaging effects and vessel damage and that hydrogen gas may be adsorbed and seep through austenitic stainless and other alloy materials without causing appreciable damage. My invention provides for the use of materials safe for liner use and separates the heavier outside wall and their girth weld to permit the use of more economical steels for the outside walls carrying the internal pressure and subject to its stresses without being subject to the hydrogen gas pressure because the liner and the liner weld is separated to permit venting of any seepage pressure against the heavier outside steel weld at their girth seams.

Description of the preferred embodiments

Figure 1:
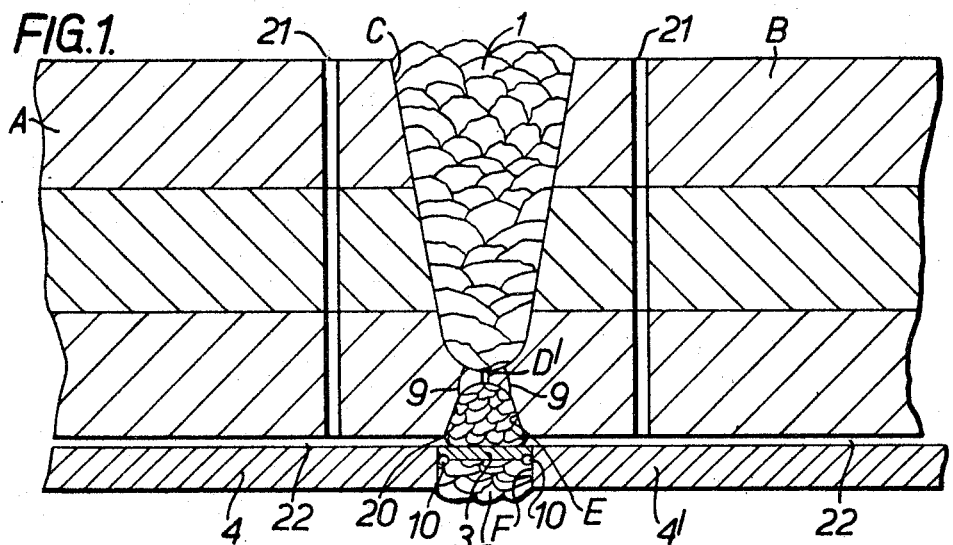
FIGURES 1, 2 and 3 are transverse sections through circumferential girth welds of the pressure vessels showing three embodiments of this invention.

As may be seen in FIGURE 1, the end surfaces of the two butting courses A and B of the vessel to be girth welded are machined or otherwise cut to form an outside U-shaped opening C for a weld, an inward land D' for mating contact between the two sections, and an inside U-shaped opening E facing inward with its bottom in the heavy wall sections being joined to form land D'. A U groove F is formed further inward through the inside layers or metal liners 4 and 4' resistant to vessel contents.

The shapes of the weld grooves are descriptive and not important as to size, slope, etc., but only typical to explain my invention.

A steel weld 1 having a compatible analysis to the heavy wall abutting sections A and B is applied from the outside of the vessel. Sections A and B are shown as being of multiple layers of steel but sections A and B can be solid or of layers as the particular design requires.

The inward lands D of the two sections are gouged out or otherwise removed from the inside of the vessel, as indicated by the lines 9, until sound metal is obtained. Thereafter weld metal 20 is deposited from the inside using steel material of compatible analysis to the heavy wall abuttin gsections A and B inward to their inside surfaces. This inward surface is made smooth by grinding or by other known methods.

A bar 3 of special material such as chrome alloy stainless steel or material resistant to hydrogen and/or vessel contents is fit circumferentially inside the girth seam and against the steel weld 20 and inwardly of the inside surfaces of sections A and B. The sides of this bar 3 are welded at 10 with side welds of compatible welding materials to each side of the resistant material liners 4 and 4′ but the side welds 10 do not penetrate or bond metallurgically to sections A or B.

The inner weld area 5 is completed to the inside surfaces and between the ends of liner layers 4 and 4′ with compatible weld material resistant to hydrogen. A space or escape is provided longitudinally and circumferentially between the outer surfaces of bar 3 and liner layers 4 and 4′ and the inner surfaces of heavy walls A and B to allow hydrogen gas seepage through the liner weld to escape to the atmosphere through the vent holes 21 provided on each side of the weld.

In FIGURE 1 a clearance 22 is shown between the outer surfaces of the liner layers 4 and 4′ and the inner surfaces of the heavy walls A and B. In practice, the heavy walls A and B are shrink assembled over the liner layers 4 and 4′ with the surfaces forming the passage shown as clearance 22 being girth or sand blasted to remove heavy mill scale while leaving them rough enough to allow gas seepage out to the vent holes 21.

In general practice, both the liner layers 4 and 4′ and the heavy walls A and B may be made from forgings having no longitudinal seams. However, the liner layers 4 and 4′ and the heavy walls A and B may be rolled from plate and welded longitudinally.

Figure 2:
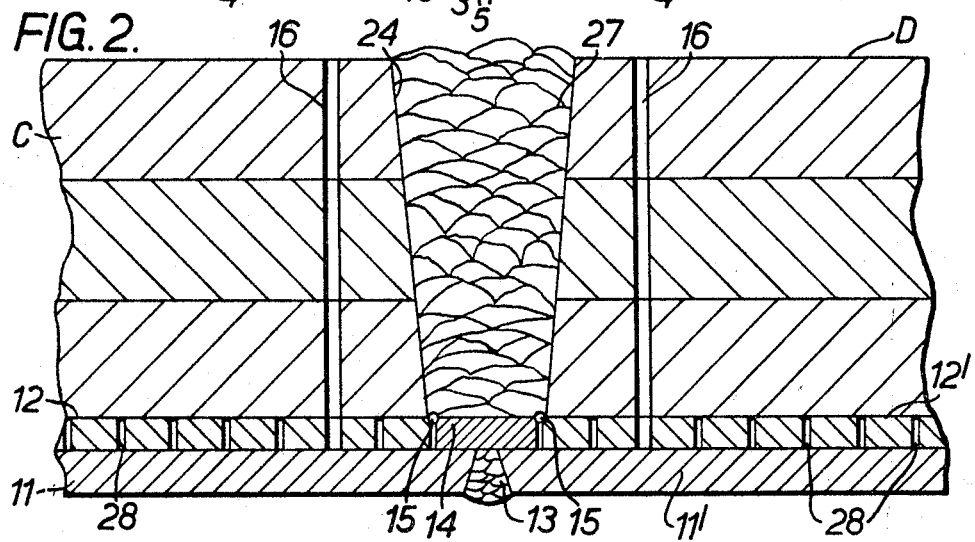

As shown in FIGURE 2, vessel sections C and D are shrink fit over the venting layers 12 and 12′ and the hydrogen resistant liners 11 and 11′. The venting layers 12 and 12′ may be of ¼ inch steel perforated and sand blasted on its inner and outer surfaces to allow the passage of gas along it. A suitable circumferential opening 24 is prepared between the ends of the vessel sections C and D to accommodate a weld. Weld 13, of hydrogen deterioration resistant metal compatible to the material of liners 11 and 11′, is first made and may be radiographically inspected. Bar 14 of steel the same thickness as the ventilating layers 12 and 12′ is fitted into place from the outside into the bottom of the circumferential gap 24 to cover weld 13. Bar 14 is welded at its two edges 15 but the two welds 15 do not penetrate to or fuse to the liners 11 and 11′ to leave a gas seepage space between the venting layers 12 and 12′ and liners 11 and 11′. Weld 27 is conventionally made to the outer surface of the vessel sections C and D. Thus gas penetrating weld 13 seeps laterally to escape through the vent holes 16. This avoids hydrogen embrittlement and other damaging effects of the main structural weld 27.

The liners 11 may be titanium zirconium, or the like which is not easily welded to steel or stainless steel alloys, but which may be welded to itself. This invention allows the walls C and D to be economically fabricated of carbon steel. The venting layers 12 and 12′ may be provided with additional venting apertures 28 to allow hydrogen to seep laterally to vent holes 16 on both the inner and outer surfaces of layers 12 and 12′.

Figure 3:
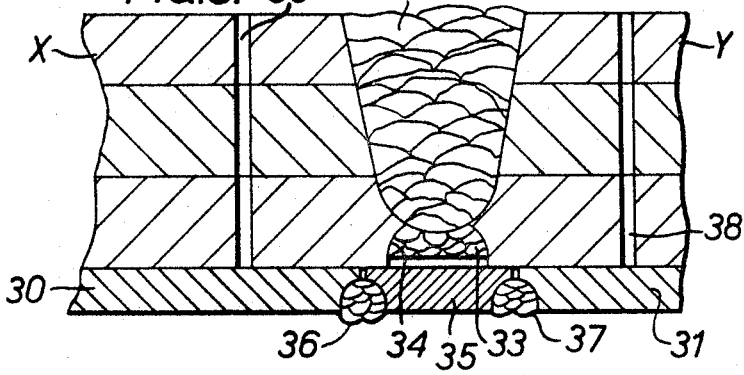

FIGURE 3 shows vessel sections X and Y which are shrink fit over the liners 30 and 31. An inner weld 33 is made in the inner circumferential groove 34. A bar 35 is placed on the inner side of weld 33 to cover weld 33 and it is welded in place at 36 and 37 to liners 30 and 31. Weld 40 completes the assembly joining the carbon steel sections X and Y. Bar 35 is of the same material as the liners 30 and 31. Thus weld 33 cannot bond to bar 35 and the welds 36 and 37 are not burned through to bond with vessel sections X and Y. This allows hydrogen gas seeping through welds 36 and 37 to seep laterally between sections X and Y and liners 30 and 31 to escape through the vent holes 38.

While two cylindrical pressure vessel sections are shown being joined in the three foregoing embodiments of this invention, the welds shown may also be used to join the top or bottom heads to the body of a pressure vessel.

I claim:
1. In a pressure vessel subject to hydrogen embrittlement and other damaging effects, said pressure vessel having portions assembled by means of girth welds, each of said portions having a liner resistant to pressure vessel contents, said portions having heavy outer walls of steel disposed about said liners, said liners being of a metal which may be welded to itself but which welds with difficulty when its welds are formed in contact with steel, the improvement comprising, in combination, an outer weld of steel joining said heavy outer walls, a smoothed inner surface of said outer weld, an annular bar of the same metal as said liners disposed against the smooth inner surface of said outer weld between said liners, said annular bar being thinner than said liners and wider than the inner surface of said outer weld to completely cover said outer weld, side welds of the same metal as said liners and said bar joining the sides of said bar to said liners, said side welds penetrating less than the thickness of said bar to avoid contact with said outer walls, and an inner weld extending between said liners and over the inside of said bar welding said liners together, said heavy outer walls containing ventilation passages passing therethrough to said liners, said ventilation passages being laterally displaced from said welds so that gas seeping through said inner weld and said side welds seeps laterally between said liners and said outer walls to escape through said ventilation passages.

2. The combination according to claim 1 wherein said liners, said side welds, said inner weld, and said bar are of zirconium.

3. The combination according to claim 1 wherein said liners, said bar, said side welds, and said inner weld are of titanium.

References Cited
UNITED STATES PATENTS

| 3,224,619 | 12/1965 | Maurin et al. | 220—3 |
| 3,231,338 | 1/1966 | Andrus | 220—3 X |

LOUIS K. RIMRODT, Primary Examiner

U.S. Cl. X.R.
220—3